(12) United States Patent
Johnson et al.

(10) Patent No.: US 8,840,115 B2
(45) Date of Patent: Sep. 23, 2014

(54) WIDE RANGE TEMPERATURE AND PRESSURE HYDRAULIC CYLINDER SEALING SYSTEM

(75) Inventors: Joel T. Johnson, Ringwood, IL (US); Benjamin E. Westbrook, Nashua, NH (US); Noriyuki Matsui, Nihonmatsu (JP); Yoshiyuki Abe, Nihonmatsu (JP); Takeshi Wakana, Nihonmatsu (JP); Mathias Burkert, Schwalmstadt (DE)

(73) Assignees: Freudenberg-NOK General Partnership, Plymouth, MI (US); Carl Freudenberg KG, Weinheim (DE); NOK Corporation, Tokyo (JP)

( * ) Notice: Subject to any disclaimer, the term of this patent is extended or adjusted under 35 U.S.C. 154(b) by 1254 days.

(21) Appl. No.: 11/684,318

(22) Filed: Mar. 9, 2007

(65) Prior Publication Data

US 2008/0217864 A1 Sep. 11, 2008

(51) Int. Cl.
F16J 15/32 (2006.01)
F16J 15/00 (2006.01)
F16J 15/56 (2006.01)

(52) U.S. Cl.
CPC ............... *F16J 15/56* (2013.01); *F16J 15/002* (2013.01)
USPC ........................................................ 277/552

(58) Field of Classification Search
USPC .................... 277/552, 558, 567, 584
See application file for complete search history.

(56) References Cited

U.S. PATENT DOCUMENTS

| | | | |
|---|---|---|---|
| 2,757,947 A * | 8/1956 | Whitten | 277/558 |
| 3,271,038 A * | 9/1966 | Bastow | 277/562 |

(Continued)

FOREIGN PATENT DOCUMENTS

| | | |
|---|---|---|
| JP | 6147327 A | 5/1994 |
| JP | 11141688 A | 5/1999 |

(Continued)

*Primary Examiner* — Vishal Patel
(74) *Attorney, Agent, or Firm* — Daniel J. Sepanik, Esq.; Harness, Dickey & Pierce, P.L.C.

(57) ABSTRACT

A seal system for a reciprocating cylinder includes a buffer seal, a rod seal, and a wiper seal. The buffer seal includes a dynamic seal lip and a static lip extending from a hinge portion. The hinge portion of the static lip allows fluid to escape past the outer diameter of the seal when the rod is retracted thereby releasing any pressure build-up between the rod seal and buffer seal. The axial face portion of the dynamic seal lip includes axially extending notches therein. The notches prevent the buffer seal from sticking to the axial wall of the groove and provide a consistent path for the fluid to energize the annular groove between the static and dynamic lips during the extension phase which is necessary for the function of the seal. The back-up ring is an integrated part of the buffer seal, used to provide superior extrusion resistance. The rod seal includes an annular seal body having a dynamic seal lip angularly extending radially inwardly and axially from the seal body, and a static lip angularly extending radially outwardly and axially from the seal body. An axial face portion of the dynamic seal lip and the static lip each include radially extending notches therein. The notches prevent the seal from sticking to the axial walls of the groove the rod seal is installed in and provides a consistent path for the fluid to energize the annular groove created by the static and dynamic lip during the extension phase. The back-up ring is an integrated part of the rod seal, used to provide superior extrusion resistance.

10 Claims, 2 Drawing Sheets

(56) References Cited

U.S. PATENT DOCUMENTS

| | | | |
|---|---|---|---|
| 3,521,893 A * | 7/1970 | Josephson | 277/584 |
| 4,089,533 A | 5/1978 | Knudson | |
| 4,553,761 A * | 11/1985 | Blesing et al. | 277/553 |
| 4,911,454 A | 3/1990 | Rapp et al. | |
| 5,088,745 A | 2/1992 | Peppiatt et al. | |
| 5,111,736 A | 5/1992 | Buchberger et al. | |
| 5,163,692 A * | 11/1992 | Schofield et al. | 277/436 |
| 5,326,112 A * | 7/1994 | Paykin | 277/575 |
| 5,833,245 A * | 11/1998 | Gallagher | 277/549 |
| 6,116,613 A | 9/2000 | Friend et al. | |
| 6,189,894 B1 * | 2/2001 | Wheeler | 277/549 |
| 6,609,716 B2 | 8/2003 | Friend et al. | |
| 6,626,437 B2 | 9/2003 | Friend | |
| 6,896,269 B2 | 5/2005 | Jackson | |

FOREIGN PATENT DOCUMENTS

| | | |
|---|---|---|
| JP | 20009106 | 1/2000 |
| JP | 2001355739 | 12/2001 |
| JP | 2002147615 A | 5/2002 |
| JP | 2004060723 A | 2/2004 |
| WO | 98/11366 | 3/1998 |

* cited by examiner

WIDE RANGE TEMPERATURE AND PRESSURE HYDRAULIC CYLINDER SEALING SYSTEM

FIELD

The present disclosure relates to seals for reciprocating members and more particularly, to a seal arrangement for sealing against a reciprocating rod.

BACKGROUND

The statements in this section merely provide background information related to the present disclosure and may not constitute prior art.

Various types of machines utilize hydraulic cylinder and piston arrangements for performing work. The piston is typically connected to a reciprocating rod that extends external to the hydraulic cylinder. The reciprocating rod is required to be sealed relative to the cylinder housing so as to maintain the hydraulic fluid within the hydraulic cylinder and to prevent dirt from entering the hydraulic system.

Exemplary sealing systems for sealing against a reciprocating rod of a hydraulic system are disclosed in U.S. Pat. Nos. 5,088,745; 6,116,613; 6,609,716; 6,626,437; and 6,896,296. In these exemplary systems, a buffer seal, a rod seal, and wiper seal are typically provided for sealing against the reciprocating rod.

SUMMARY

The present disclosure provides improvements to the seal components of a sealing system used to prevent leakage of fluid through the opening between the rod and housing of a reciprocating hydraulic cylinder. In particular, a buffer seal for sealing against a reciprocating rod includes an annular seal body having a seal lip extending radially inward and axially from the seal body and a static lip extending radially outward and axially from the seal body. The static lip has a hinge portion for attachment to the seal body that is axially spaced relative to a sealing edge of the static lip. The sealing edge of the static seal is disposed radially outward from the seal lip. The hinge portion of the static lip allows pressure relief when the rod is retracted (moved back toward the system pressure side) thereby minimizing pressure build up between the rod seal and buffer seal. The axial face portion of the dynamic seal lip includes radially extending notches therein. The notches prevent the seal from sticking to the radial wall of the groove, via the work of adhesion as a component of surface tension, the buffer seal is installed in and provides a path for the return of fluid thus making it a part of the venting system used to elevate pressure build up between the buffer seal and the rod seal. The back-up ring is an integrated part of the buffer seal, used to provide superior extrusion resistance (into a gap created between the rod and the housing) than the material used to make the main body of the seal can provide.

According to another aspect of the present disclosure, a rod seal for sealing against a reciprocating rod includes an elastomeric annular seal body having a dynamic seal lip angularly extending radially inwardly and axially from the seal body and a static lip angularly extending radially outward and axially from the seal body. An annular groove is defined radially between the dynamic seal lip and the static lip. An axial face portion of the dynamic seal lip and the static lip each include radially extending notches therein. The notches prevent the seal from sticking to the radial walls of the groove, via the work of adhesion as a component of surface tension, the rod seal is installed in and provides a path for the return of fluid into the system thus making it a part of the venting system used to alleviate pressure build up between the wiper seal and the rod seal. The dynamic seal lip and the static lip are generally symmetrical relative to the annular groove. The back-up ring is an integrated part of the rod seal, used to provide superior extrusion resistance (into a gap created between the rod and the housing) than the material used to make the main body of the seal can provide.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
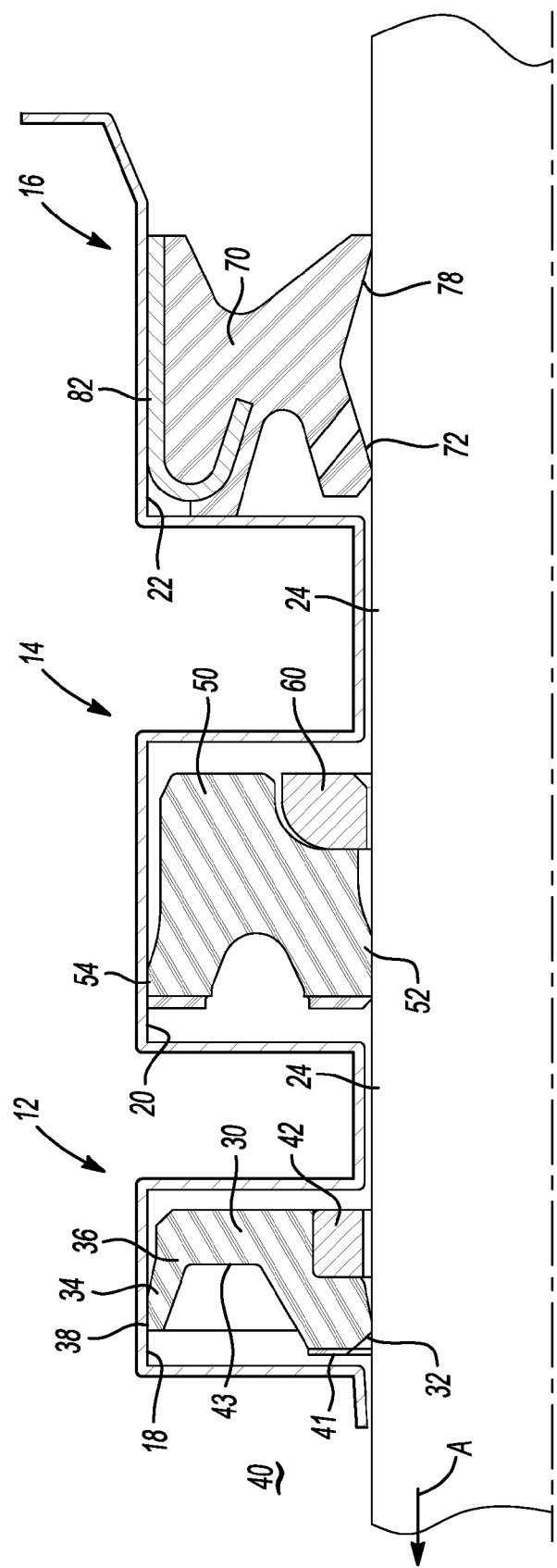
FIG. 1 is a partial cross-sectional view of a seal system for a hydraulic component in accordance with an exemplary embodiment of the present disclosure.

The following description is merely exemplary in nature and is not intended to limit the present disclosure, application, or uses. It should be understood that throughout the drawings, corresponding reference numerals indicate like or corresponding parts and features.

With reference to FIGS. 1-4, a seal system (FIG. 1) for a hydraulic component will now be described. The seal system includes a buffer seal 12, a rod seal 14 and a wiper seal 16 each supported within respective recessed annular grooves 18, 20, 22 provided in a housing or other support structure. The buffer seal 12, rod seal 14, and wiper seal 16, are each designed to engage a reciprocating rod 24 or other member of a hydraulic system.

Figure 2:
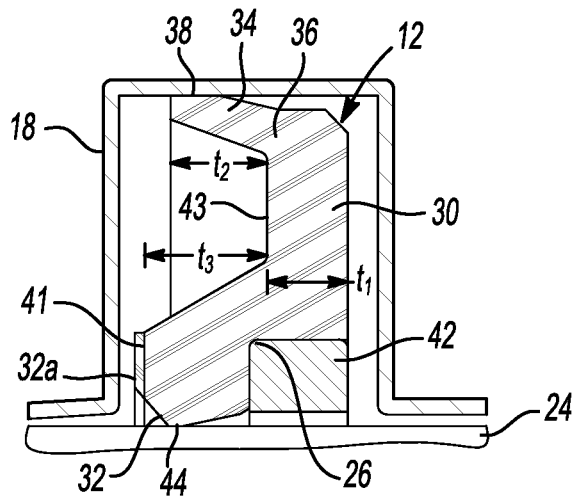
FIG. 2 is a partial cross-sectional view of a buffer seal according to principles of the present disclosure.

With particular reference to FIG. 2, the buffer seal 12 seals against the reciprocating rod 24 and includes an annular seal body 30 having a dynamic seal lip 32 extending radially inward and axially from the seal body 30. A static lip 34 extends radially outward and axially from the seal body 30. The seal body 30, dynamic seal lip 32 and static lip 34 are preferably integrally formed from a urethane material. The static lip 34 has a hinge portion 36 for attachment to the seal body 30 that is axially spaced relative to a sealing edge 38 of the static lip 34. The sealing edge 38 of the static lip 34 is disposed radially outward from the seal lip 32. The hinge portion 36 of the static lip 34 allows fluid flow around the outer side of the seal thus providing pressure relief when the rod 24 is retracted (moved back toward the system pressure side 40) thereby minimizing pressure build up between the rod seal 14 and buffer seal 12. The axial face portion 32A of the dynamic seal lip 32 includes one or more radially extending notches 41 therein. The notches prevent the seal face 32A from sticking to the adjacent radial wall of the groove 18, via the work of adhesion as a component of surface tension, that the buffer seal 30 is installed and provides a consistent path for the fluid to energize (pressurize) the annular groove 43 during the extension phase (toward the Air Side of FIG. 1) which is necessary for the function of the dynamic lip 32. The radial notches allow for release of pressure that vents past the static lip 38 when the rod 24 is retracted (moved back toward the system Pressure Side 40).

An annular back-up ring 42 is disposed radially inward from the seal body 30 and axially adjacent to the dynamic seal lip 32. The back-up ring 42 is disposed in a radially outward recessed pocket 26 of the seal body 30 making it an integrated part of the seal. The back-up ring 42 is normally made of a material that has improved extrusion resistance to the seal body 30 material so as to provide superior resistance to extrusion of the material into the gap created between the rod 24 and the housing.

The dynamic seal lip 32 and the static lip 34 define an annular channel 43 therebetween. The dynamic seal lip 32 can extend axially to a greater extent than the static seal lip 34, as shown in FIG. 2. The seal body 30 has an axial thickness t1 and the static seal lip 34 has a length t2 greater than the axial thickness t1 of the seal body 30. The distance t2 also generally defines a depth of the annular channel 43. The dynamic seal lip 32 has an axial length t3 greater than the axial thickness t1 of the seal body 30. The seal lip 32 includes a sharp edge portion 44 adapted for engaging the reciprocating rod 24.

Figure 3:
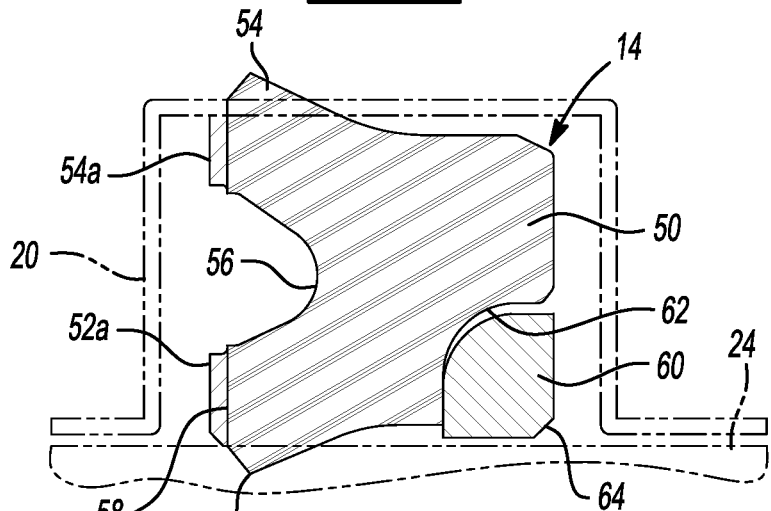
FIG. 3 is a partial cross-sectional view of rod seal according to the principles of the present disclosure.

With particular reference to FIG. 3, the rod seal 14 seals against the reciprocating rod 24 and includes an elastomeric annular seal body 50 having a dynamic seal lip 52 angularly extending radially inwardly and axially from the seal body 50, and a static lip 54 angularly extends radially outwardly and axially from the seal body 50. An annular groove 56 is defined radially between the dynamic seal lip 52 and the static lip 54. An axial face portion 52A of the dynamic seal lip 52 and an axial face portion 54A of the static lip 54 each include one or more radially extending notches 58 therein. The notches 58 prevent the seal from sticking, via the work of adhesion as a component of surface tension, to the axial walls of the groove the rod seal is installed in 20 and provides a consistent path for the fluid to energize (pressurize) the annular groove 56 during the extension phase (movement of the rod 24 towards the Air Side in FIG. 1) which is necessary for the function of the dynamic lip 52 and static lip 54. It also allows for release of pressure that will vent past the static lip 54 if there is pressure build-up between the wiper seal 16 and the rod seal 14 when the rod is retracted (movement of the rod 24 toward the system pressure side 40), as illustrated in FIG. 1. The dynamic seal lip 52 and the static lip 54, as shown, can be generally symmetrical relative to the annular groove 56. The symmetrical arrangement assists in minimizing twisting of the rod seal 14 in the axial direction since the symmetrical arrangement tends to centralize itself in the annular recessed groove 20.

An annular back-up ring 60 is disposed in a radially outwardly recessed pocket 62 of the seal body 50. The annular back-up ring 60 has a radially inner surface 64 that is angled relative to an axis A of the seal body 50. The back-up ring 60 is normally made of a material that has improved extrusion resistance to the seal body 50 material so as to provide superior resistance to extrusion of said material into the gap created between the rod 24 and the housing.

Figure 4:
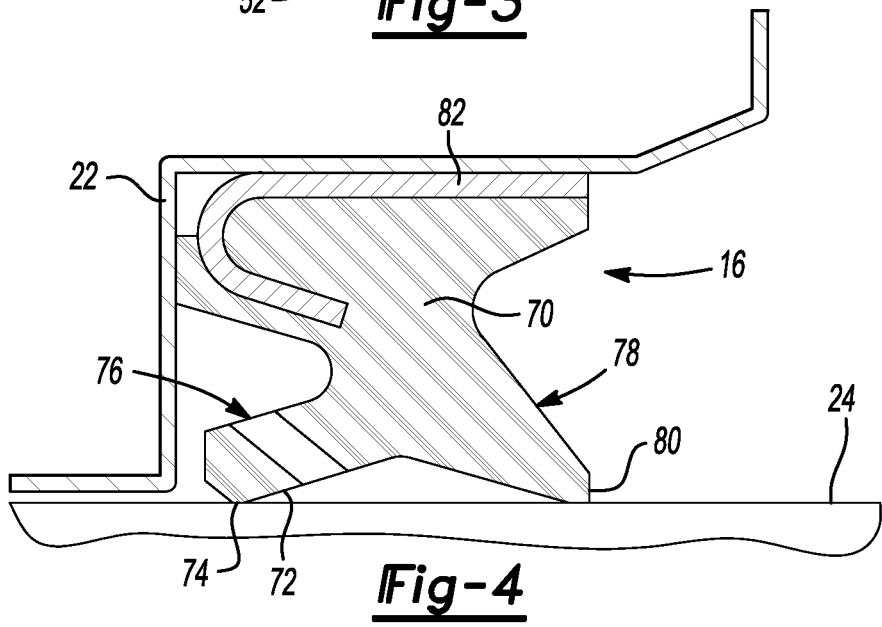
FIG. 4 is a partial cross-sectional view of a wiper seal according to the principles of the present disclosure.

With reference to FIG. 4, the wiper seal 16 includes an annular seal body 70 having two dynamic sealing lips (72 and 78). The inward facing sealing lip 72 extending axially and radially towards the pressure side of the system (FIG. 1) for engagement with the rod 24. The sealing lip 72 includes a sharp contact edge 74 engaging the rod 24. The sealing lip 72 includes one or more vent passage 76 extending therethrough. The vent passages 76 prevent pressure build up between the contact edge 74 and the wiping edge 80. The vent passages 76 also prevent pressure build up between rod seal 14 and wiper seal 16. The outward facing wiper lip 78 angularly extends axially and radially for engagement with the rod 24, and extends axially in a direction opposite to the sealing lip 72. The wiper lip 78 has a contact portion 80 that engages the rod 24 and prevents contamination from entering into the system via a scraping action, but also allows re-entry of the thin lubricating film during the retraction stroke of the rod 24. A metal encasement 82 surrounds the seal body 70 and provides a positive outside diameter seal when press fit into the housing 22.

What is claimed is:

1. A buffer seal for sealing a reciprocating rod, comprising: an annular seal body having a dynamic seal lip extending radially inward and axially from said seal body and a static seal lip extending radially outward and axially from said seal body, said static seal lip having a hinge portion for attachment to said seal body that is axially spaced relative to a sealing edge of said static seal lip, said sealing edge of said static seal lip being disposed radially outward from said dynamic seal lip, wherein said dynamic seal lip extends axially to a greater extent than said static seal lip, said dynamic seal lip having an axial face portion that includes a flat planar face having a plurality of radial notches therein, said hinge portion of said static seal lip including a bend about which an entire length of said static seal lip flexes to allow fluid flow around an outer side of the buffer seal to provide pressure relief when the reciprocating rod is retracted; and an annular back-up ring disposed radially inward from said seal body and axially adjacent to said dynamic seal lip.

2. The buffer seal according to claim 1, wherein said dynamic seal lip and said static seal lip define an annular channel therebetween.

3. The buffer seal according to claim 1, wherein said annular seal body is made from urethane.

4. The buffer seal according to claim 1, wherein said seal body has an axial thickness and said static seal lip has a length greater than said axial thickness of said seal body.

5. The buffer seal according to claim 1, wherein said dynamic seal lip has an axial length greater than said an axial thickness of said seal body.

6. The buffer seal according to claim 5, wherein said dynamic seal lip includes a sharp edge portion adapted for engaging the reciprocating rod.

7. A rod seal for sealing against a reciprocating rod, comprising: an elastomeric annular seal body having a dynamic seal lip angularly extending radially inward and axially from said seal body and a static lip angularly extending radially outward and axially from said seal body generally equal distance with said dynamic seal lip, an annular groove being defined radially between said dynamic seal lip and said static lip, an axial face portion of said dynamic seal lip and said static lip each include a flat planar face including radially extending notches therein.

8. The rod seal according to claim 7, further comprising an annular back-up ring disposed in a radially outwardly recessed pocket of said seal body.

9. The rod seal according to claim 8, wherein said annular back-up ring has a radially inner surface that is angled relative to an axis of said seal body.

10. The rod seal according to claim 7, wherein said dynamic seal lip and said static lip are generally symmetrical relative to said annular groove.

* * * * *

UNITED STATES PATENT AND TRADEMARK OFFICE
CERTIFICATE OF CORRECTION

PATENT NO. : 8,840,115 B2  
APPLICATION NO. : 11/684318  
DATED : September 23, 2014  
INVENTOR(S) : Joel T. Johnson et al.

Page 1 of 1

It is certified that error appears in the above-identified patent and that said Letters Patent is hereby corrected as shown below:

In the Claims

At column 4, claim 5, line 41, after "than", delete "said".

Signed and Sealed this  
Tenth Day of March, 2015

Michelle K. Lee  
*Deputy Director of the United States Patent and Trademark Office*